W. JANENSCH.
PROCESS OF AGITATING AND AERATING SUBSTANCES.
APPLICATION FILED JULY 1, 1914.
1,123,542.
Patented Jan. 5, 1915.
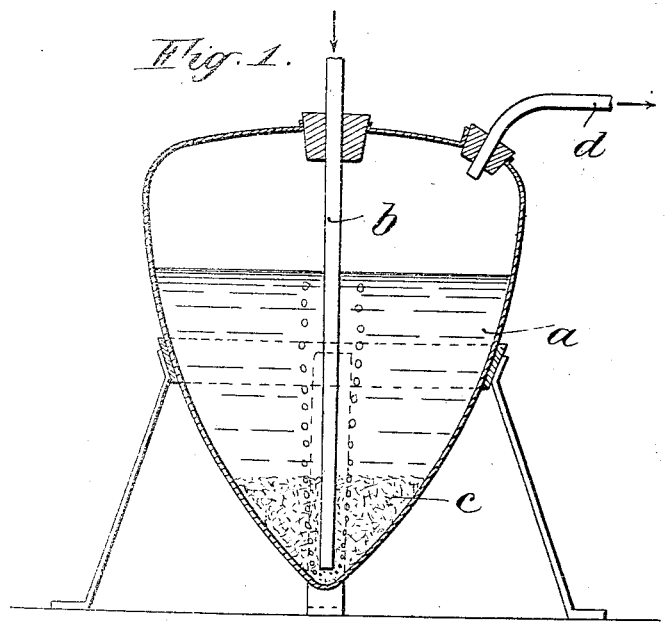
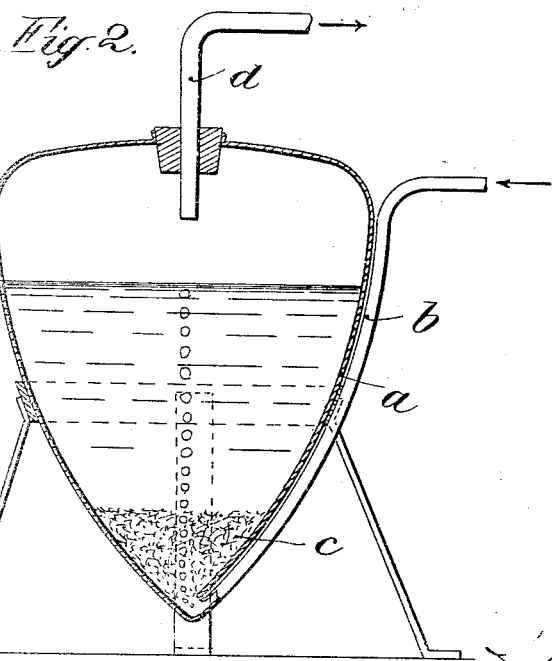

UNITED STATES PATENT OFFICE.

WERNER JANENSCH, OF CHARLOTTENBURG, GERMANY.

PROCESS OF AGITATING AND AERATING SUBSTANCES.

1,123,542.  Specification of Letters Patent.  Patented Jan. 5, 1915.

Application filed July 1, 1914. Serial No. 848,404.

*To all whom it may concern:*

Be it known that I, WERNER JANENSCH, a subject of the King of Prussia, and residing at 26 Linden allee, Charlottenburg, Germany, have invented certain new and useful Improvements in Processes of Agitating and Aerating Substances; and I do hereby declare the following to be a full, clear, and exact description of the invention.

In order to obtain a thorough stirring, mixing and aerating of liquids, powders, grains, or the dissolving or lixiviation of powdery, granular, fibrous and the like substances with the least possible expenditure of energy, a suction current is, according to the present invention, led in a continuous, intermittent, or alternating manner into the lower end of an inverted conical vessel. The said current can, according to the requirements and to the substance to be treated, consist of air only, or of water, or of both simultaneously or also alternately. When employing the suction current, for producing which air or water is drawn from the top of the air-tightly closed vessel, the contents are relieved of pressure, which favors an intimate mixing of the same with the liquid which is being used.

A strengthening of the action of the current is attained by leading it in intermittently, owing to the fact that during the pauses the substance immediately above the point of entry of the current is able to collect and is here subjected to the action of the current to a particularly high degree. The intermittent current may also be a pressure current.

Particularly advantageous is the use of an intermittent current, which is led back and forth in the vessel and piping as suction or pressure current, *i. e.*, the current works in an alternating manner. The increased result attainable with this manner of working is due to the fact that, when the alternating current is used for dissolving or lixiviating purposes, the portion of the substance entering the admission pipe when the current recedes, is driven with great force into the dissolving vessel or into the mass of substance and liquid contained in the said vessel, when the current passes. The substance emerging from the admission pipe thus acts as a plunger to promote dissolving. Also the suction effect which is set up at the mouth of the admission pipe when the current recedes assists in the dissolving action, owing to the fact that it imparts a whirling motion to the substance to be dissolved and the liquid. Further, since at each alternation of the current every particle of the same comes into contact with the substance to be dissolved, a saturated solution can be particularly rapidly obtained, if the entire mass of the dissolving liquid at each alternation is driven through the substance to be dissolved lying at the bottom of the vessel and in the admission pipe.

A further special action of the alternating current is due to the fact that the substance to be dissolved, when it is carried along with the receding current from the vessel into the admission pipe, is subjected to an increase in pressure when passing the restriction at the bottom of the vessel. There is consequently a pressing and crushing action on the substance to be dissolved set up at this point, which, especially in the case of a substance of an animal or vegetable nature and having cellular, spongy, or gelatinous properties, as *e. g.* sliced beet-root, results in a tearing asunder of the inned cellular tissues and in this manner is able in a high degree to promote the lixiviating and dissolving action. This crushing action can be increased by having a suitable, *e. g.* a slit-shaped form of cross-section at the narrowest part, or by having lateral projections. For the backwardly directed current no special source of energy is necessary, since if *e. g.* the alternating current consists of a stream of liquid driven by compressed air, the pressure needs only to be interrupted in such a manner, that the liquid itself generates the backwardly directed current under the action of gravity.

By employing an air-tightly closed vessel, (*e. g.* in the case of volatile liquids or dusty powders), the pressure or vacuum formed in the vessel produces the backward current by itself.

The drawing illustrates in sectional views two forms of construction of the vessel used in this process.

According to Figure 1, the current is led through the pipe $b$ to the lowest point of the vessel $a$, at which the substance $c$ to be dissolved collects, and carries the parts of the substance situated there away with it toward the top, while the remaining portion of the substance is able to slide down the sloping walls of the apex of the vessel. According to Fig. 2, the admission pipe *b* entering the apex from outside is preferably led down from above, in order to prevent a running off of the dissolving liquid and of the substance to be dissolved.

The admission pipe may in both forms of constructions be chosen of various widths according to the purpose for which the apparatus is required, and it may also be formed to increase in size toward the top in the same manner as the containing vessel.

According as to whether a pressure or suction current is employed, the vessel may be open or closed at the top, or it may be provided with an outlet pipe.

When using a suction current, the vessel *a* is closed at the top, and the air contained in the vessel is drawn off through the pipe *d*, so that air or liquid, or both simultaneously or alternately, stream in through the pipe *b*.

I claim:

1. A process for agitating and aerating liquids and mixtures of liquids and powders, which consists in inducing an intermittent flow of fluid current through the substance to be treated.

2. A process for agitating and aerating liquids and mixtures of liquids and powders, which consists in inducing an alternating flow of fluid current through the substance to be treated.

3. A process for agitating and aerating liquids and mixtures of liquids and powders, which consists in inducing by suction, an intermittent flow of fluid current through the substance to be treated.

4. A process for agitating and aerating liquids and mixtures of liquids and powders which consists in inducing by suction, an alternating flow of fluid current through the substance to be treated.

In testimony that I claim the foregoing as my invention, I have signed my name in presence of two subscribing witnesses.

WERNER JANENSCH.

Witnesses:
  WOLDEMAR HAUPT,
  HENRY HASPER.